US012447110B2

(12) United States Patent
Lim et al.

(10) Patent No.: US 12,447,110 B2
(45) Date of Patent: Oct. 21, 2025

(54) TWO-CHAMBER TYPE COMBINED CONTAINER-SYRINGE

(71) Applicant: DAEWOONG PHARMACEUTICAL CO., LTD., Gyeonggi-do (KR)

(72) Inventors: Duck Soo Lim, Gyeonggi-do (KR); Jun Sik Kim, Gyeonggi-do (KR); Tae Ho Lee, Gyeonggi-do (KR); Sung Hoon Park, Gyeonggi-do (KR)

(73) Assignee: DAEWOONG PHARMACEUTICAL CO., LTD., Hwaseong-si (KR)

( * ) Notice: Subject to any disclaimer, the term of this patent is extended or adjusted under 35 U.S.C. 154(b) by 536 days.

(21) Appl. No.: 17/253,667

(22) PCT Filed: Nov. 27, 2018

(86) PCT No.: PCT/KR2018/014743
§ 371 (c)(1),
(2) Date: Dec. 18, 2020

(87) PCT Pub. No.: WO2020/111296
PCT Pub. Date: Jun. 4, 2020

(65) Prior Publication Data
US 2021/0322272 A1 Oct. 21, 2021

(51) Int. Cl.
*A61J 1/20* (2006.01)

(52) U.S. Cl.
CPC ........... *A61J 1/2096* (2013.01); *A61J 1/2055* (2015.05)

(58) Field of Classification Search
CPC .. A61M 2005/3132; A61M 2005/3139; A61M 2005/31598; A61M 5/2448;
(Continued)

(56) References Cited

U.S. PATENT DOCUMENTS 6,565,529 B1 * 5/2003 Kimber ................. A61M 5/315 604/110
2006/0189943 A1 * 8/2006 Kato ..................... A61M 5/284 604/191
(Continued)

FOREIGN PATENT DOCUMENTS

CN 1512899 A 7/2004
CN 103228308 A 7/2013
(Continued)

*Primary Examiner* — Laura A Bouchelle
*Assistant Examiner* — Sarah Dympna Grasmeder
(74) *Attorney, Agent, or Firm* — Myers Bigel, P.A.

(57) ABSTRACT

The present invention provides a two-chamber type combined container-syringe including: a cylinder having a first end portion, a second end portion in an opposite direction of the first end portion, and a bypass portion disposed between the first end portion and the second end portion; a finger grip mounted on the second end portion of the cylinder; a first stopper, a second stopper, and a third stopper that are sequentially disposed from the first end portion toward the second end portion in a space of the cylinder; and a plunger rod that is connected to the third stopper and has a plurality of support ribs provided to come in contact with an inner surface of the finger grip, wherein a space between the first stopper and the second stopper forms a front chamber, a space between the second stopper and the third stopper forms a rear chamber, a first ingredient and a second ingredient are accommodated in the front chamber and the rear chamber, respectively, a length ratio of the front chamber and the rear chamber is in a range of 1.6:1 to 3:1 when the plunger rod is at an initial position which is a state before the front chamber and the rear chamber communicate with each other through the bypass portion, and at the initial
(Continued)

position, one or more support ribs are disposed in at least one of the finger grip and a region in the cylinder that is adjacent to the finger grip.

6 Claims, 10 Drawing Sheets

(58) Field of Classification Search
CPC .... A61M 5/3135; A61M 5/3137; A61M 5/19; A61M 5/31511; A61J 1/2055; A61J 1/2096; A61J 1/20; A61J 1/202; A61J 1/2003
See application file for complete search history.

(56) References Cited

U.S. PATENT DOCUMENTS

| | | | | |
|---|---|---|---|---|
| 2008/0262435 | A1* | 10/2008 | Erickson | A61M 5/31531 604/218 |
| 2012/0095394 | A1* | 4/2012 | Kakiuchi | A61M 5/284 604/89 |
| 2013/0116628 | A1* | 5/2013 | Kulshrestha | A61L 31/143 604/227 |
| 2016/0243305 | A1 | 8/2016 | Nakamura et al. | |
| 2017/0209646 | A1* | 7/2017 | Butts | A61M 5/31513 |
| 2021/0331856 | A1* | 10/2021 | Kreutzmann | B65D 83/767 |

FOREIGN PATENT DOCUMENTS

| | | | |
|---|---|---|---|
| JP | 2005515847 | A | 6/2005 |
| JP | 2008067982 | A | 3/2008 |
| JP | 2012157640 | | 8/2012 |
| JP | 2012157640 | A | 8/2012 |
| KR | 10-0299434 | B1 | 10/2001 |
| KR | 10-2004-0031198 | A | 4/2004 |
| KR | 1020090102324 | A | 9/2009 |
| KR | 10-0989872 | B1 | 10/2010 |
| KR | 10-2014-0124828 | A | 10/2014 |
| KR | 10-1909761 | B1 | 10/2018 |
| WO | 2012067141 | | 5/2012 |
| WO | 2017005914 | A1 | 4/2018 |
| WO | 2010132290 | A2 | 11/2018 |

* cited by examiner

【FIG. 1】
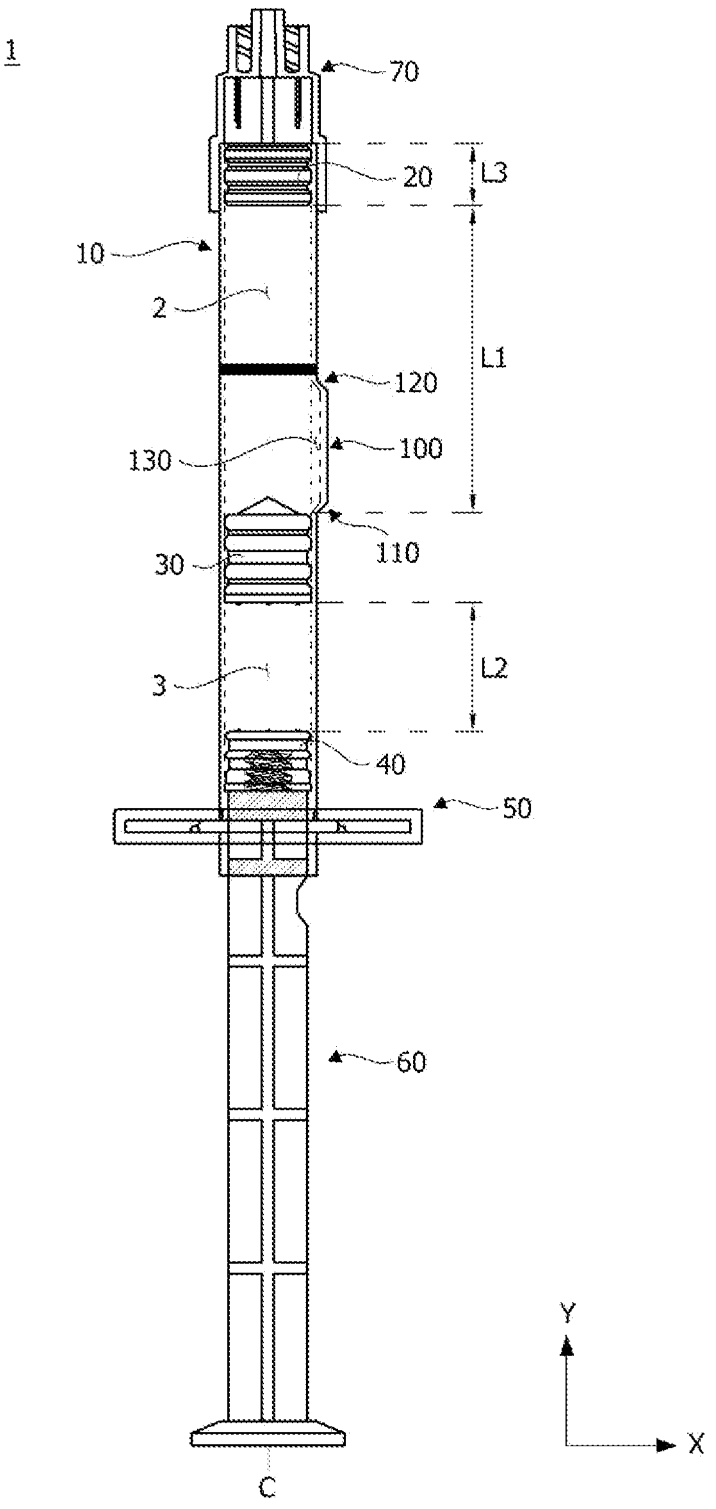

【FIG. 2】
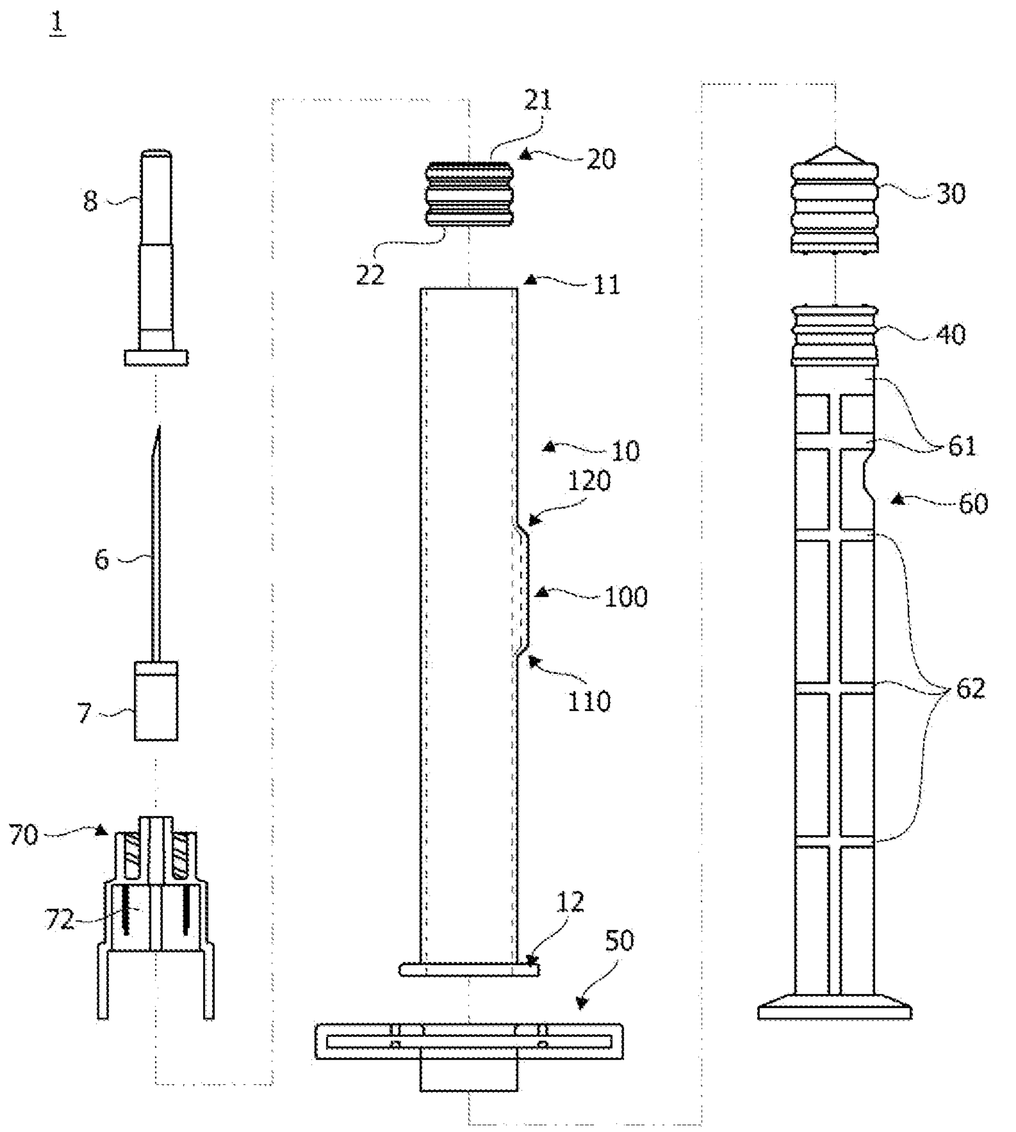

【FIG. 3】
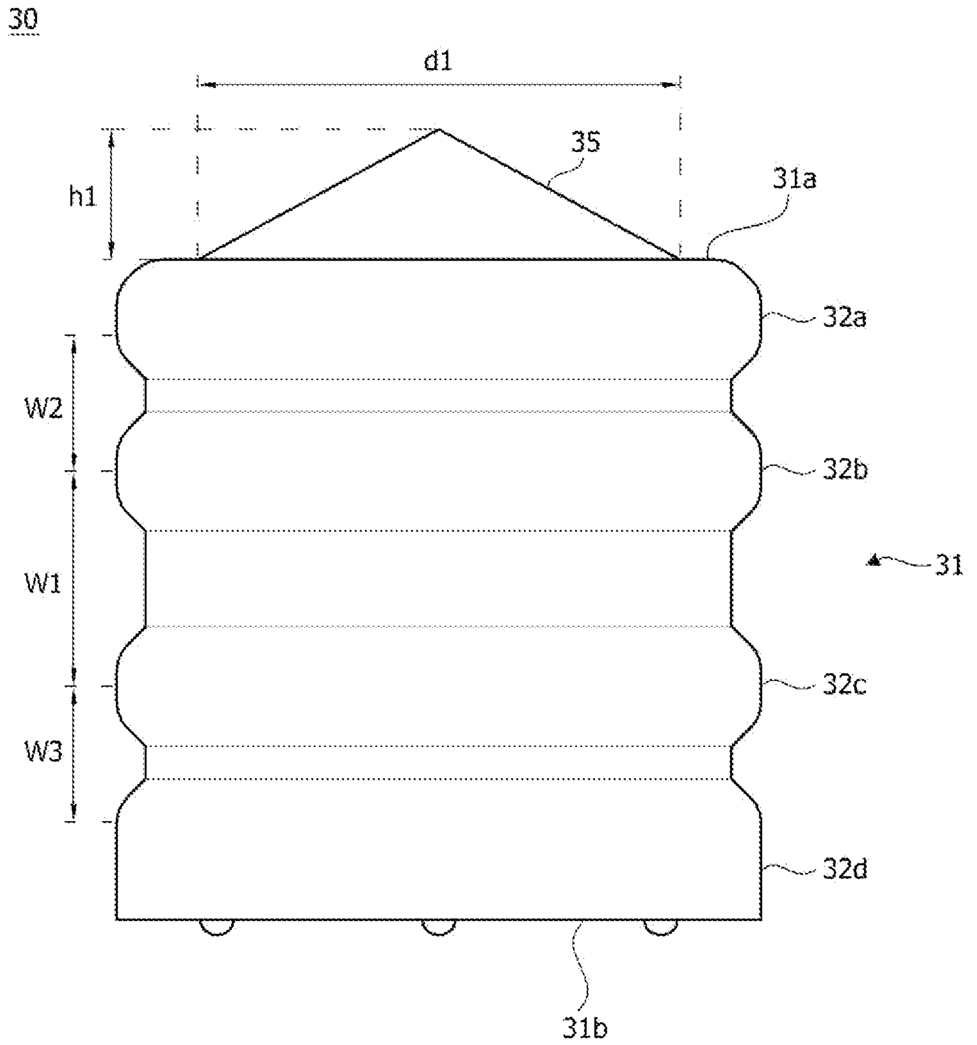
32 : 32a, 32b, 32c, 32d

【FIG. 4】
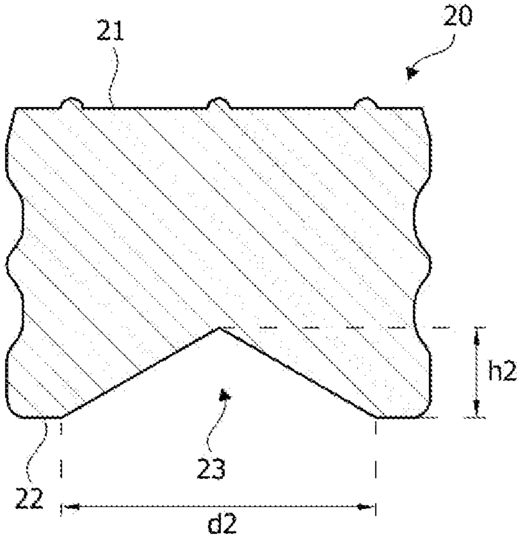
【FIG. 5】
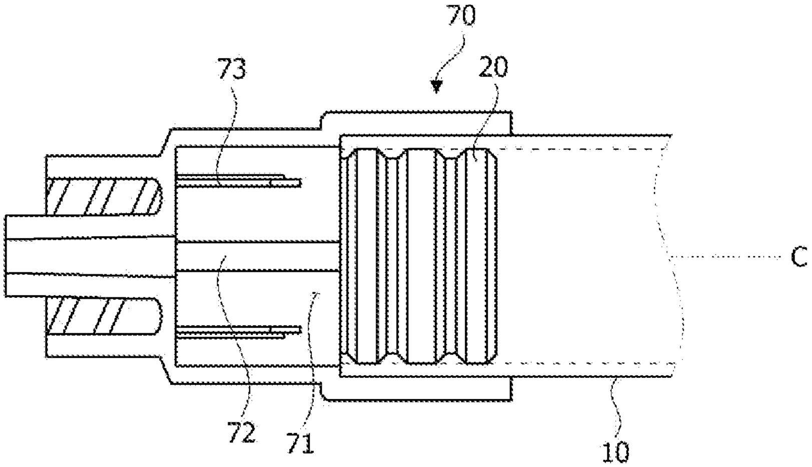

【FIG. 6】
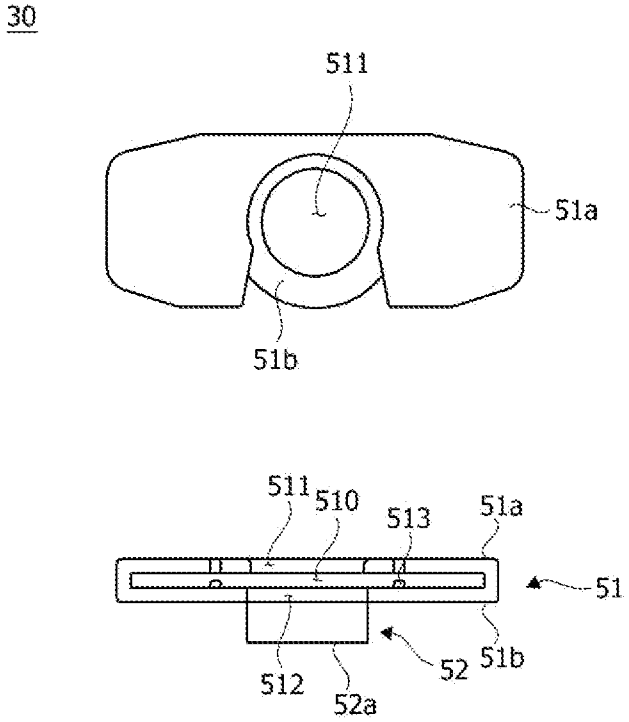

【FIG. 7】
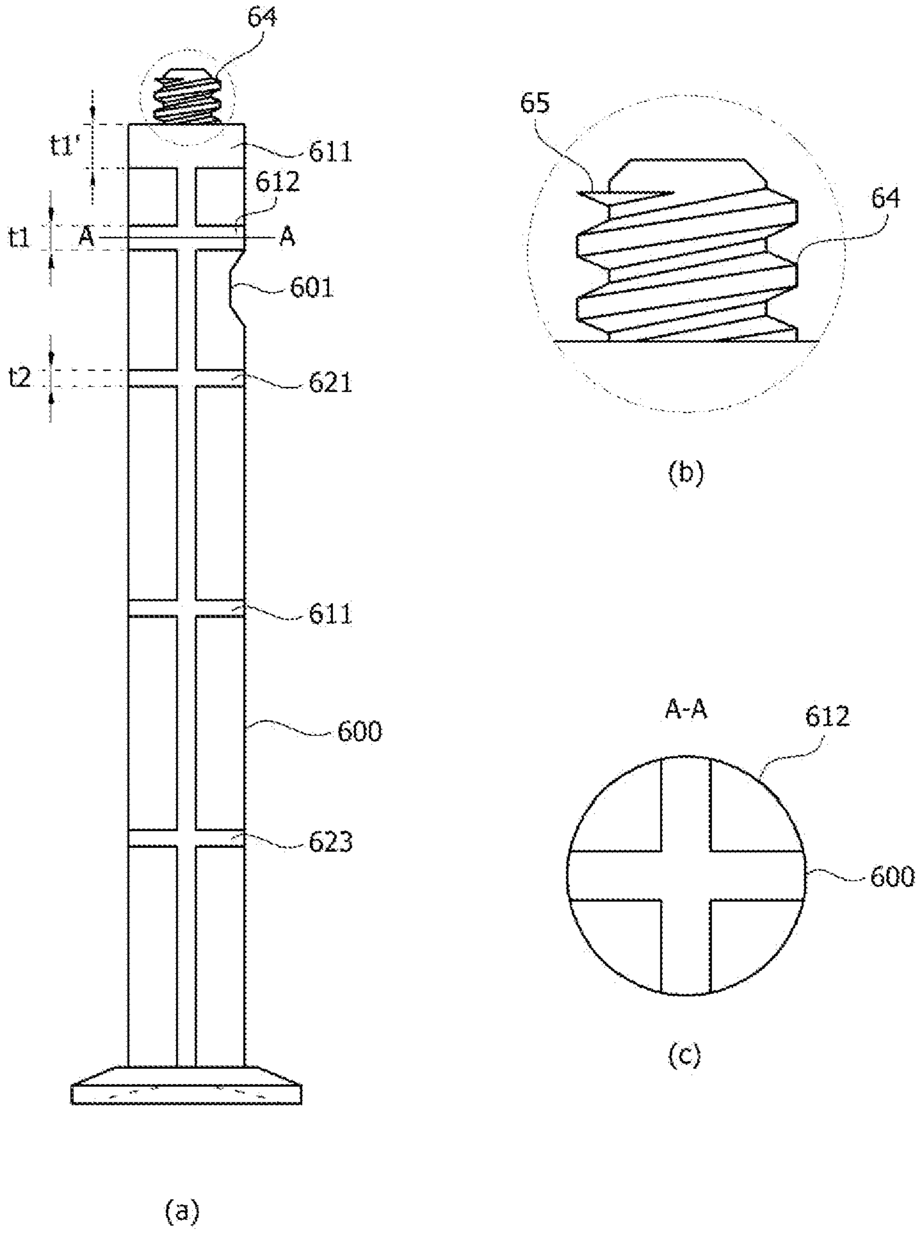

【FIG. 8】
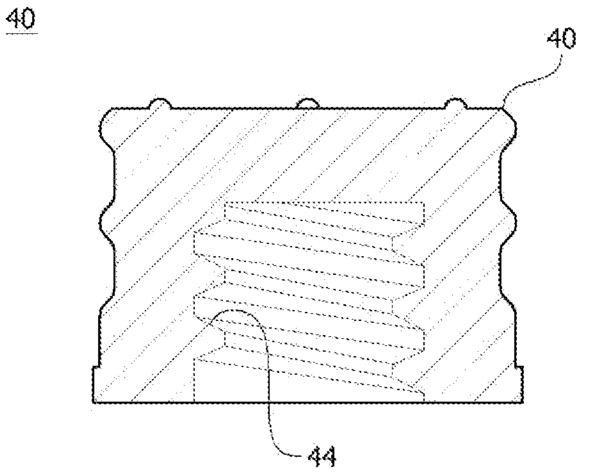
【FIG. 9】
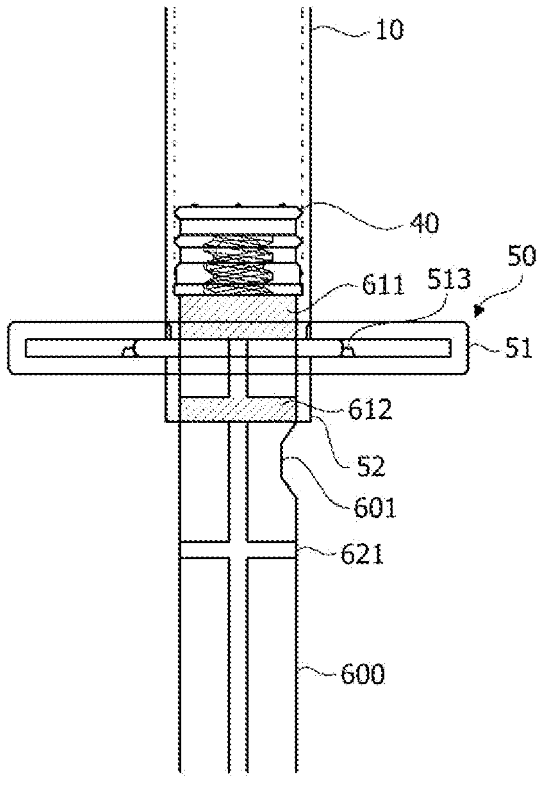

【FIG. 10】
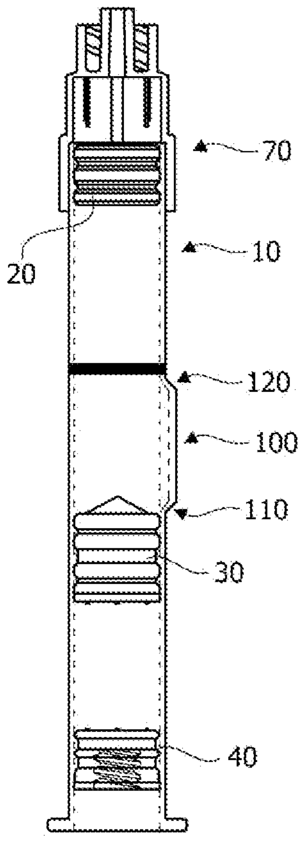

【FIG. 11】
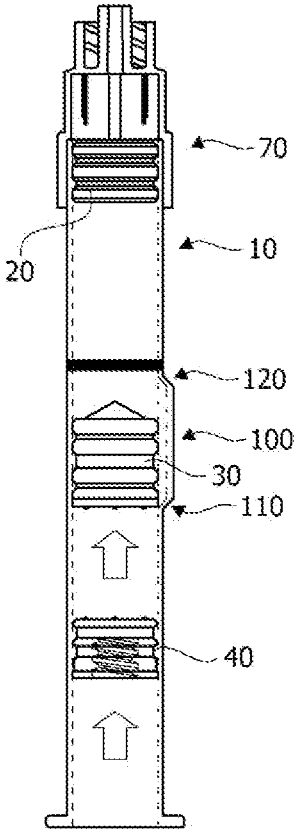

【FIG. 12】
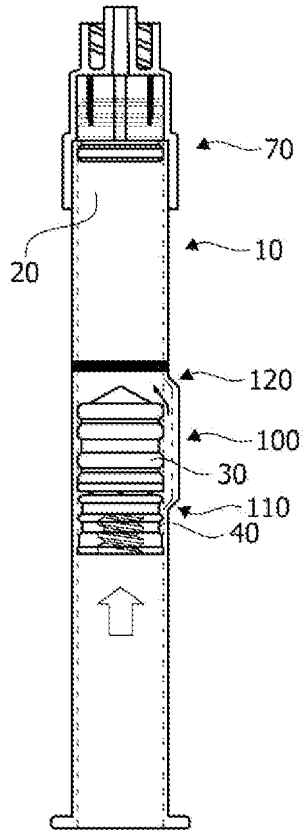

TWO-CHAMBER TYPE COMBINED CONTAINER-SYRINGE

TECHNICAL FIELD

The present invention relates to a two-chamber type combined container-syringe (prefilled syringe).

BACKGROUND ART

A combined container-syringe is widely used in the medical industry due to being convenient and safe to use because the syringe is prefilled with a medicinal fluid and thus the syringe itself may be used immediately without transferring the medicinal fluid from a separate medicinal fluid container into the syringe in medical institutions.

As the combined container-syringe, a two-chamber type combined container-syringe is known, which has a form in which separate spaces are formed in a cylinder of the syringe and a medicinal agent and a medicinal fluid may be separately accommodated.

The two-chamber type combined container-syringe has a structure in which three stoppers (also referred to as "plugs" or "gaskets") are inserted into the cylinder of the syringe and a space is formed between two adjacent stoppers such that two spaces are formed in the cylinder.

The stoppers are classified as a front stopper, a middle stopper, and a rear stopper according to the order in which the stoppers are inserted to be adjacent to an injection needle in the cylinder of the syringe. In general, a medicinal agent is accommodated in a first-chamber space that is formed between the front stopper and the middle stopper in the cylinder of the syringe, and a medicinal fluid is accommodated in a second-chamber space that is formed between the middle stopper and the rear stopper.

Also, the cylinder of the syringe is manufactured in a hollow cylindrical shape, and a groove portion of which a portion protrudes outward is formed in an inner surface of a middle portion of the cylinder. Due to the groove portion, the medicinal fluid accommodated in the second chamber may bypass into the groove portion along an edge of the middle stopper and move to the first chamber. That is, the groove portion is manufactured to serve as a bypass path.

When using the two-chamber type combined container-syringe having the above configuration, a plunger coupled to the rear stopper is pressed with a finger to cause the rear stopper to move forward in the cylindrical cylinder, and then, due to the forward movement of the rear stopper, a pressing force is transmitted to the medicinal fluid and the middle stopper. As a result, the middle stopper also moves forward along with the forward movement of the rear stopper.

Also, when the plunger is moved forward continuously and the middle stopper reaches the groove portion that serves as a bypass path, the groove portion serving as a bypass path allows the first chamber and the second chamber to be connected at the edge of the middle stopper so that a fluid is movable between the first chamber and the second chamber. Also, the medicinal fluid accommodated in the second chamber flows into the first chamber due to the pressing force, and the medicinal fluid flowing into the first chamber is mixed with the medicinal agent accommodated in the first chamber such that an injection drug is prepared.

Therefore, when administering a drug to a patient using the two-chamber type combined container-syringe, the injection drug, which is prepared by the medicinal agent and the medicinal fluid being mixed in the first chamber of the syringe, is administered to the patient.

However, in the conventional two-chamber type combined container-syringe, at an initial stage in which the second chamber and the first chamber formed in the cylinder of the syringe communicate with each other due to the bypass groove portion, the medicinal fluid passing through the groove portion has relatively large kinetic energy due to being pressed by the plunger.

Consequently, in a case in which the plunger is pushed rapidly, the medicinal fluid accommodated in the second chamber exits the bypass groove portion rapidly, and a portion of the medicinal fluid reaches a portion of a syringe body where the injection needle is mounted. Here, a portion of the medicinal fluid may leak through a gap or another groove formed in a portion where the front stopper is coupled to an inner surface of the cylinder of the syringe, or in some cases, a problem may occur in that the medicinal fluid flows backward toward the bypass groove portion.

Therefore, the medicinal fluid that leaks toward the front of the front stopper is pressed out together with air in the first chamber and leaks toward the injection needle. In this case, the combined container-syringe itself may be contaminated, or due to leakage of the medicinal fluid, the amount of medicinal fluid may be insufficient for dispersing and dissolving the medicinal agent. Thus, there may be a problem in that it is not possible to accurately prepare an injection drug that contains the medicinal fluid and the medicinal agent in proper proportion.

Also, in the two-chamber type combined container-syringe, there is a problem in that, in a case in which shaking of a plunger rod occurs when a user uses the syringe, the medicinal fluid leaks toward the plunger rod. Also, there is a problem in that the shaking makes it difficult for the user to stably mix the medicinal fluid and the medicinal agent in the syringe.

DISCLOSURE

Technical Problem

The present invention is directed to providing a two-chamber type combined container-syringe capable of further improving sealability and stability of a medicinal agent and a medicinal fluid, allowing mixing of the medicinal agent and the medicinal fluid to be performed more effectively, and reducing shaking of a plunger rod.

Technical Solution

One aspect of the present invention provides a two-chamber type combined container-syringe including: a cylinder having a first end portion, a second end portion in an opposite direction of the first end portion, and a bypass portion disposed between the first end portion and the second end portion; a finger grip mounted on the second end portion of the cylinder; a first stopper, a second stopper, and a third stopper that are sequentially disposed from the first end portion toward the second end portion in a space of the cylinder; and a plunger rod that is connected to the third stopper and has a plurality of support ribs provided to come in contact with an inner surface of the finger grip, wherein a space between the first stopper and the second stopper forms a front chamber, a space between the second stopper and the third stopper forms a rear chamber, a first ingredient and a second ingredient are accommodated in the front chamber and the rear chamber, respectively, a length ratio of the front chamber and the rear chamber is in a range of 1.6:1 to 3:1 when the plunger rod is at an initial position which is a state before the front chamber and the rear chamber communicate with each other through the bypass portion, and at the initial position, one or more support ribs are disposed in at least one of the finger grip and a region in the cylinder that is adjacent to the finger grip.

Also, at the initial position, one support rib may be disposed so that one surface thereof coincides with a longitudinal end of the finger grip.

Also, the finger grip may include a grip portion and an extending portion that extends from the grip portion toward the plunger rod.

Also, at the initial position, at least one support rib may be disposed in the extending portion.

Also, at the initial position, one support rib may be disposed so that one surface thereof coincides with a longitudinal end of the extending portion.

Also, the second stopper may have a plurality of contact ribs that come in contact with an inner circumferential surface of the cylinder, and a surface of the rearmost contact rib, which is adjacent to the finger grip, that comes in contact with the inner circumferential surface of the cylinder may be formed as a flat surface.

Also, a surface of at least one contact rib that comes in contact with the inner circumferential surface of the cylinder may be formed as a curved surface portion.

Also, the second stopper may include a first member that has a front surface, a rear surface, and a plurality of contact ribs and a second member that protrudes from the first member toward the first end portion, and the plurality of contact ribs may be formed on a side surface that connects the front surface and the rear surface.

Also, the plunger rod may further include a plurality of reinforcing ribs disposed at rear ends of the support ribs, and a thickness of each support rib may be formed to be thicker than a thickness of each reinforcing rib.

Also, the second stopper may have a first contact rib, a second contact rib, a third contact rib, and a fourth contact rib, and a gap between the second and third contact ribs may be larger than a gap between the first and second contact ribs or a gap between the third and fourth contact ribs.

Advantageous Effects

According to the present invention, by sufficiently securing volumes of a front chamber and a rear chamber that accommodate a medicinal agent and a medicinal fluid, respectively, mixing of the medicinal agent and the medicinal fluid can be performed more effectively.

Also, by providing a second stopper to have four contact ribs, sealability between the medicinal fluid and the medicinal agent can be improved, and thus safety of the syringe can be further improved.

Also, by forming support ribs on a plunger rod, leakage of the medicinal fluid toward the plunger rod can be prevented, and simultaneously, shaking of the plunger rod can be reduced. In this way, user convenience can be improved.

In addition, a sharp end portion formed in a circumferential direction of a first screw thread of the plunger rod has an effect of increasing a coupling force between the plunger rod and a third stopper.

DESCRIPTION OF DRAWINGS

FIG. 1 is a view illustrating a two-chamber type combined container-syringe according to an embodiment of the present invention.

FIG. 2 is a view of a state in which elements in FIG. 1 are separated.

FIG. 3 is a view illustrating a second stopper according to an embodiment of the present invention.

FIG. 4 is a cross-sectional view illustrating a first stopper according to an embodiment of the present invention.

FIG. 5 is an enlarged view of a needle mounting portion illustrated in FIG. 1.

FIG. 6 is a view illustrating a finger grip according to an embodiment of the present invention.

FIG. 7 is a view illustrating a plunger rod according to an embodiment of the present invention.

FIG. 8 is a view illustrating a third stopper according to an embodiment of the present invention.

FIG. 9 is a view illustrating a state in which the finger grip and the plunger rod are coupled to a cylinder according to an embodiment of the present invention.

FIGS. 10 to 12 are views illustrating only major elements to describe one operational state of the two-chamber type combined container-syringe illustrated in FIG. 1.

MODES OF THE INVENTION

Hereinafter, exemplary embodiments of the present invention will be described in detail with reference to the accompanying drawings. The terms or words used in the present specification and the claims should not be limitedly interpreted in their general or dictionary meanings but, based on the principle that an inventor may properly define concepts of terms to describe his or her invention in the best possible way, should be interpreted in meanings and concepts in accordance with the technical idea of the present invention.

Also, the same or corresponding elements will be denoted by the same or like reference numerals throughout the drawings and repeated descriptions thereof will be omitted. For convenience of description, the size and shape of each element illustrated in the drawings may have been exaggerated or reduced.

Therefore, since the embodiments described herein and the elements illustrated in the drawings are merely illustrative of the present invention and do not represent the entire technical idea of the present invention, it should be understood that various equivalents and modified examples, which may substitute for the embodiments described herein, may be present at the time of filing the application.

FIG. 1 is a view illustrating a two-chamber type combined container-syringe 1 according to an embodiment of the present invention, and FIG. 2 is a view of a state in which elements in FIG. 1 are separated.

Referring to FIGS. 1 and 2, the two-chamber type combined container-syringe 1 (hereinafter referred to as "syringe 1") according to an embodiment of the present invention includes a cylinder 10 having a bypass portion 100, a first stopper 20, a second stopper 30, and a third stopper 40 that are sequentially disposed in a space of the cylinder 10, a finger grip 50 mounted at the rear of the cylinder 10, and a plunger rod 60 connected to the third stopper 40.

More specifically, the cylinder 10 has a first end portion 11, a second end portion 12 in an opposite direction of the first end portion 11, and the bypass portion 100 disposed between the first end portion 11 and the second end portion 12.

The finger grip 50 may be mounted on the second end portion 12 of the cylinder 10.

The first stopper 20, the second stopper 30, and the third stopper 40 may be sequentially disposed from the first end portion 11 toward the second end portion 12 in the space of the cylinder 10.

Here, a space between the first stopper 20 and the second stopper 30 forms a front chamber 2, and a space between the second stopper 30 and the third stopper 40 forms a rear chamber 3.

A first ingredient and a second ingredient may be accommodated in the front chamber 2 and the rear chamber 3, respectively.

The plunger rod 60 may be connected to the third stopper 40 and have a plurality of support ribs 61 provided to come in contact with an inner surface of the finger grip 50.

When the plunger rod 60 is at an initial position which is a state before the front chamber 2 and the rear chamber 3 communicate with each other through the bypass portion 100, a length ratio of the front chamber 2 and the rear chamber 3 may be in a range of 1.6:1 to 3:1, and at the initial position, one or more support ribs 61 may be disposed in at least one of the finger grip 50 and a region in the cylinder that is adjacent to the finger grip 50.

In the present document, the initial position refers to a state in which the first and second ingredients are accommodated in the front chamber 2 and the rear chamber 3, respectively, before the plunger rod 60 is moved forward, that is, a state before a user operates the syringe.

Also, the syringe 1 includes a needle mounting portion 70 mounted on the cylinder 10, a hub 7 mounted on the needle mounting portion, and a needle 6 fixed to the hub 7.

Also, the syringe 1 includes a protective cap 8 configured to protect the needle 6.

More specifically, the cylinder 10 has a hollow cylindrical shape having a central axis C and has the first end portion 11 and the second end portion 12 in the opposite direction of the first end portion 11.

The cylinder 10 may be provided so that the needle mounting portion 70 is connected to the first end portion 11 and the plunger rod 60 is inserted toward the second end portion 12 in the opposite direction of the first end portion 11.

Also, the second end portion 12 may be provided to protrude to a predetermined height outward in a circumferential direction of an outer circumferential surface of the cylinder 10 so that the finger grip 50 is mounted thereon.

Here, the cylinder 10 having a cylindrical shape may be made of transparent glass or resin, may extend along the central axis C, and may have a uniform diameter.

Also, the cylinder 10 has the bypass portion 100 formed as a groove portion in an inner circumferential surface. The bypass portion 100 has a flow path 130 in which the inner circumferential surface of the cylinder 10 is recessed outward in a radial direction.

The flow path 130 may be provided to have a predetermined length in a longitudinal direction.

In the present document, for convenience of description, a direction toward the first end portion 11 of the syringe 1 is referred to as "front," a direction toward the second end portion 12 is referred to as "rear," a surface of each element that faces the first end portion 11 is referred to as "front surface," and a surface of each element that faces the second end portion 12 is referred to as "rear surface."

Also, "longitudinal direction" of a specific element indicates the y-axis direction of FIG. 1 (a direction along the central axis C of FIG. 1), "length" indicates a length in the longitudinal direction, and "radial direction" indicates the x-axis direction of FIG. 1.

Meanwhile, the syringe 1 includes the first stopper 20 disposed in the cylinder 10 so as to be adjacent to the first end portion 11 of the cylinder 10, the second stopper 30 disposed in the cylinder 10 so as to be disposed at the rear of the first stopper 20, and the third stopper 40 disposed in the cylinder 10 so as to be disposed at the rear of the second stopper 30.

Here, the first stopper 20, the second stopper 30, and the third stopper 40 indicate a front stopper, a middle stopper, and a rear stopper, respectively.

The first stopper 20, the second stopper 30, and the third stopper 40 are sequentially disposed from the first end portion 11 toward the second end portion 2 in the space of the cylinder 10, and the front chamber 2 and the rear chamber 3 are provided in each space between the first to third stoppers 20, 30, and 40.

Specifically, the front chamber 2 accommodating the first ingredient is formed between the first stopper 20 and the second stopper 30. Here, the first ingredient may be a medicinal agent.

Also, the rear chamber 3 accommodating the second ingredient is formed between the second stopper 30 and the third stopper 40. Here, the second ingredient may be a medicinal fluid.

Each of the first to third stoppers 20, 30, and 40 may be formed of a medical rubber material and provided to be pressed against the inner circumferential surface of the cylinder 10 to seal the front chamber 2 and the rear chamber 3. Therefore, for airtightness, each of the first to third stoppers 20, 30, and 40 may be provided to have a diameter larger than an inner diameter of the cylinder 10 and may have a plurality of ring-shaped protrusions (also referred to as "contact ribs") provided thereon to come in contact with the inner circumferential surface of the cylinder 10.

Also, in a state in which the first ingredient (medicinal agent) and the second ingredient (medicinal fluid) are accommodated in the front chamber 2 and the rear chamber 3, respectively, before the first ingredient (medicinal agent) and the second ingredient (medicinal fluid) are mixed, the front chamber 2 and the bypass portion 100 are connected so that a fluid is movable therebetween, and the rear chamber 3 and the bypass portion 100 are separated by the second stopper 30 so that a fluid is not movable therebetween.

Also, the bypass portion 100 has an inlet 110 through which the second ingredient flows into the groove portion (flow path) from the rear chamber 3 and an outlet 120 through which the second ingredient flows out to the front chamber 2 from inside the groove portion (flow path).

FIG. 3 is a view illustrating a second stopper according to an embodiment of the present invention.

Referring to FIG. 3, the second stopper 30 may include a first member 31 having a front surface 31*a*, a rear surface 31*b*, and a plurality of contact ribs 32, and the plurality of contact ribs 32 may be formed on a side surface that connects the front surface 31*a* and the rear surface 31*b*.

The second stopper 30 may further include a second member 35 that protrudes from the first member 31 toward the first end portion 11.

The first member 31 may come in contact with the inner circumferential surface of the cylinder 10 and seal the rear chamber 3, and the second member 35 may protrude from the first member 31 toward the first end portion 11 of the cylinder 10 without coming in contact with the inner circumferential surface of the cylinder 10.

The second member 35 may have a conical shape of which a diameter decreases in a direction toward the first end portion 11.

Specifically, the first member 31 of the second stopper 30 may have the plurality of contact ribs 32 that come in contact with the inner circumferential surface of the cylinder 10, and a surface of the rearmost contact rib 32*d*, which is adjacent to the finger grip 50, that comes in contact with the inner circumferential surface of the cylinder 10 may be formed as a flat surface.

Also, a surface of at least one contact rib 32*a*, 32*b*, or 32*c* of the contact ribs may be formed as a curved surface portion.

More specifically, the contact ribs 32 may have first to fourth contact ribs 32*a*, 32*b*, 32*c*, and 32*d* that come in contact with the inner circumferential surface of the cylinder 10.

For example, surfaces of the first to third contact ribs 32*a*, 32*b*, and 32*c* that come in contact with the inner circumferential surface of the cylinder 10 may be formed as curved surface portions, and a surface of the fourth contact rib 32*d* that comes in contact with the inner circumferential surface of the cylinder 10 may be formed as a flat surface.

By forming the surface of the fourth contact rib 32*d* coming in contact with the inner circumferential surface of the cylinder 10 as a flat surface as described above, sealing between the first ingredient (medicinal agent) and the second ingredient (medicinal fluid) may be performed more effectively.

In particular, a gap w1 between the second and third contact ribs 32*b* and 32*c* may be formed to be larger than a gap w2 between the first and second contact ribs 32*a* and 32*b* or a gap w3 between the third and fourth contact ribs 32*c* and 32*d*.

By forming the four contact ribs on the second stopper 30 as described above, sealing between the front chamber and the rear chamber may be performed more effectively, and slidability may be improved when the second stopper 30 moves forward through the curved surface portion.

That is, the first member 31 has the first to fourth contact ribs 32*a*, 32*b*, 32*c*, and 32*d* formed thereon to come in contact with the inner circumferential surface of the cylinder 10, and the second member 35 is formed to protrude from the first contact rib 32*a* toward the first end portion 11 of the cylinder 10 and has an outer circumferential surface that includes an inclined surface having a predetermined angle with respect to the central axis C in the longitudinal direction of the cylinder 10.

In addition, FIG. 4 is a cross-sectional view illustrating the first stopper according to an embodiment of the present invention.

The first stopper 20 may have a front surface 21 and a rear surface 22, and a plurality of ring-shaped protrusions (also referred to as "contact ribs") that come in contact with the inner circumferential surface of the cylinder 10 may be provided on a side surface that connects the front surface and the rear surface.

Here, a recessed portion 23, into which the second member 35 may be inserted, may be provided in the rear surface 22 of the first stopper 20.

The recessed portion 23 may be provided in a conical shape that matches the conical shape of the second member 35. That is, a height h1 of the second member 35 and a diameter d1 of the base of the second member 35 are the same as a height h2 of the recessed portion 23 and a diameter d2 of the base of the recessed portion 23, respectively.

Also, the recessed portion 23 may have an open base and an inner circumferential surface that includes an inclined surface having a predetermined angle with respect to the central axis C in the longitudinal direction.

Therefore, when the second stopper 30 moves forward and thus comes in contact with the first stopper 20, the second member 35 may be inserted into the recessed portion 23, the front surface 31*a* of the first member 31 may come in contact with the rear surface 22 of the first stopper 20, and the outer circumferential surface of the second member 35 may come in contact with the inner circumferential surface of the recessed portion 23.

Also, the conical recessed portion 23 may serve to effectively disperse the kinetic energy of the second ingredient, that is, the medicinal fluid, flowing into the front chamber 2.

FIG. 5 is an enlarged view of the needle mounting portion 70 illustrated in FIG. 1.

The needle mounting portion 70 has a space 71 into which the first stopper 20 may be inserted, and the space 71 is connected to an interior of the needle 6 so that a fluid is movable therebetween. Also, gap forming portions 72 and 73 that come in contact with a circumferential surface of the first stopper 20 (the side surface thereof connecting the front surface and the rear surface) to form a predetermined gap in a space therebetween are provided at an inner circumferential surface of the needle mounting portion 70. The gap forming portions may include one or more groove portions 72 and one or more protruding portions 73 that extend in the longitudinal direction.

Also, when the first stopper 20 moves forward toward the first end portion 11, the first stopper 20 enters the space 71. When the first stopper 20 enters the space 71, due to the first stopper 20 coming in contact with the gap forming portions 72 and 73, a predetermined gap is formed between the first stopper 20 and the space 71. Here, a mixture of the medicinal agent and the medicinal fluid that is in the front chamber 2 may move toward the needle 6 through the gap.

FIG. 6 is a view illustrating the finger grip 50 according to an embodiment of the present invention.

Referring to FIG. 6, the finger grip 50 may be mounted at the rear of the cylinder 10, that is, on the second end portion 12.

Specifically, the finger grip 50 includes a grip portion 51 and an extending portion 52 that extends from the grip portion 51 toward the plunger rod.

The grip portion 51 has a predetermined thickness and includes a fitting portion 510 having a predetermined space formed therein so that the second end portion 12 of the cylinder 10 is inserted and coupled thereto.

In order to allow the second end portion 12 of the cylinder 10 to pass through the fitting portion 510 and be fitted and inserted thereto, the grip portion 51 includes a first surface 51*a* having a first insertion hole 511 formed at open one side and a second surface 51*b* having a second insertion hole 512 provided so that the plunger rod 60, which is in an opposite direction of the first surface 51*a*, is inserted thereinto.

Here, the fitting portion 510 may be a space formed by a side surface that connects the first surface 51*a* and the second surface 51*b*.

In order to allow the second end portion 12 of the cylinder, which is inserted into the fitting portion 510, to be fixed to the finger grip, the grip portion 51 has a pair of mounting protrusions 513 formed to protrude from the second surface 51*b* of the grip portion toward the fitting portion 510.

The pair of mounting protrusions 513 may come in contact with an outer circumferential surface of the second end portion 12 of the cylinder and fix the finger grip.

Also, the finger grip includes the extending portion 52 that extends from the second surface 51*b* of the grip portion 51 toward the plunger rod.

The extending portion 52 may be formed to extend from the second surface 51*b* in the longitudinal direction along the circumferential direction of the second insertion hole 512.

That is, a longitudinal end surface 52*a* of the extending portion 52 may be formed in a ring shape.

Therefore, the plunger rod 60 may sequentially pass through the extending portion 52 and the second insertion hole 512 and be inserted into the cylinder.

FIG. 7 is a view illustrating the plunger rod 60 according to an embodiment of the present invention, and FIG. 8 is a view illustrating the third stopper according to an embodiment of the present invention.

Referring to FIGS. 7 and 8, the plunger rod 60 is connected to the third stopper 40, is disposed in the finger grip 50, and has the plurality of support ribs 61 provided to come in contact with the inner surface of the finger grip 50.

The plunger rod 60 further includes a plurality of reinforcing ribs 62 disposed at rear ends of the support ribs 61.

More specifically, the plunger rod 60 includes a body portion 600 that is formed to extend in the longitudinal direction. The body portion 600 may have a cross-shaped cross-section.

Each of the support ribs 61 and the reinforcing ribs 62 may be formed to extend from the body portion 600 in the radial direction. Here, each rib may have a circular shape.

The plurality of support ribs 61 include a first support rib 611 formed at a distal end side of the body portion 600 of the plunger rod and a second support rib 612 disposed at the rear of the first support rib 611 so as to be spaced a predetermined distance apart from the first support rib 611.

Also, the plurality of reinforcing ribs 62 include a first reinforcing rib 621, a second reinforcing rib 622, and a third reinforcing rib 623 that are each disposed at the rear of the second support rib 612 so as to be spaced a predetermined distance apart therefrom.

Here, each of the support ribs 61 and the reinforcing ribs 62 may increase the rigidity of the plunger rod.

In addition, thicknesses t1 and t1' of the support ribs 61 may be formed to be thicker than a thickness t2 of each reinforcing rib 62.

More specifically, the thickness t1' of the first support rib 611 and the thickness t1 of the second support rib 612 may be formed to be thicker than the thickness t2 of each of the first to third reinforcing ribs 621, 622, and 623.

Here, the thickness t1' of the first support rib 611 may be formed to be thicker than the thickness t1 of the second support rib 612.

Also, the plunger rod 60 has a first screw thread 64 provided to be fastened to the third stopper 40, and the third stopper 40 has a second screw thread 44 provided to be engaged with the first screw thread 64 as the first screw thread 64 rotates.

In particular, a sharp end portion 65 is formed in at least a partial region of the first screw thread 64 in a circumferential direction of the first screw thread 64.

The sharp end portion 65 refers to a region in which a circumferential side of at least a partial region of the first screw thread 64 is sharply formed.

Due to the sharp end portion 65 of the first screw thread 64 that is described above, when the first screw thread 64 is coupled to the second screw thread 44 of the third stopper 40, a coupling force is further improved. Thus, when a user moves the plunger rod 60 toward the rear, the plunger rod 60 may be prevented from being separated from the third stopper 40.

Here, when the plunger rod 60 is in the initial state, a partial region of the plunger rod may be inserted into at least one of the finger grip and a region in the cylinder that is adjacent to the finger grip.

In addition, the plunger rod 60 may include a plunger groove portion 601 that is formed to be adjacent to the second support ribs 612. The plunger groove portion 601 may be formed to be recessed inward by a predetermined depth from the body portion 600 of the plunger rod, and, for example, the plunger groove portion 601 may be an injection gate formed when manufacturing the plunger rod by injection molding.

That is, the injection gate may be formed at a rear end of the support rib and utilized as a position identification means.

When the user connects the plunger rod 60 to the third stopper 40 (assembles the cylinder and the plunger rod), the plunger groove portion 601 may allow the position of the plunger rod 60 to be identified to facilitate placing the second support rib 612 of the plunger rod 60 at a longitudinal end of the finger grip.

Therefore, when the user connects the plunger rod 60 to the third stopper 40 so that the plunger rod 60 is disposed at the initial position, since the position of the plunger rod 60 may be identified due to the plunger groove portion 601, the assembling is facilitated.

The initial position (initial state) of the syringe 1 formed as described above is a state before the front chamber 2 and the rear chamber 3 communicate with each other through the bypass portion 100 and may be a state in which the one or more support ribs 61 of the plunger rod 60 are disposed in at least one of the finger grip 50 and a region in the cylinder 10 that is adjacent to the finger grip 50.

More specifically, at least one of the support ribs 61 may be disposed in the finger grip 50, and the remaining support rib 61 may have one portion disposed in the finger grip 50 and the other portion disposed in the region in the cylinder that is adjacent to the finger grip 50.

Also, at least one of the support ribs 61 may be disposed in the finger grip 50, and the remaining support rib 61 may be disposed in the region in the cylinder that is adjacent to the finger grip 50.

In particular, at the initial position, one support rib 61 may be disposed so that one surface thereof coincides with the longitudinal end of the finger grip.

FIG. 9 is a view illustrating a state in which the finger grip and the plunger rod are coupled to the cylinder according to an embodiment of the present invention.

Referring to FIG. 9, at the initial position, at least one of the support ribs 61 may be disposed in the extending portion 52.

That is, one support rib 61 may be disposed in the extending portion 52, and the remaining support rib 61 may have one portion disposed in the extending portion 52 and the other portion disposed in the cylinder.

In particular, at the initial position, one support rib 61 may be disposed so that one surface thereof coincides with the longitudinal end of the extending portion 52.

One surface (rear surface) of the one support rib 61 coinciding with the longitudinal end of the extending portion 52 means that the longitudinal end surface 52*a* of the extending portion is substantially coplanar with the one surface of the support rib (an exposed surface of the support rib, which is disposed in the finger grip, that is exposed to the outside (the rear surface of the support rib)).

Here, being "substantially coplanar" includes a case in which the support rib 61 protrudes from, or is inserted into, the finger grip 50 by a length that corresponds to 10% of the thickness of the support rib 61.

Specifically, one surface (rear surface) of the one support rib 61 coinciding with the longitudinal end of the extending portion 52 means that the longitudinal end surface 52*a* of the extending portion is substantially coplanar with one surface of the second support rib 612 (an exposed surface of the second support rib, which is disposed in the finger grip, that is exposed to the outside (the rear surface of the second support rib)).

That is, being "substantially coplanar" includes a case in which the second support rib 612 protrudes from, or is inserted into, the finger grip 50 by a length that corresponds to 10% of the thickness of the second support rib 612.

More specifically, at the initial position, the first support rib 611 and the second support rib 612 of the plunger rod 60 may be disposed in at least one of the finger grip 50 and the region in the cylinder that is adjacent to the finger grip, and particularly, one surface of the second support rib 612 may be disposed to coincide with the longitudinal end of the finger grip 50.

Also, at the initial position, the second support rib 612 may be disposed in the finger grip 50, and the first support rib 611 may have a portion disposed in the finger grip 50 and the other portion disposed in the cylinder.

Also, at the initial position, the second support rib 612 may be disposed in the finger grip 50, and the first support rib 611 may be disposed in the region in the cylinder that is adjacent to the finger grip 50.

Also, one surface (rear surface) of the second support rib 612 may be disposed to coincide with the longitudinal end of the finger grip 50.

Also, at the initial position, the second support rib 612 may be disposed in the extending portion 52, and the first support rib 611 may have a portion disposed in the extending portion 52 and the other portion disposed in the region in the cylinder that is adjacent to the finger grip 50.

In particular, one surface (rear surface) of the second support rib 612 may be disposed in the extending portion 52.

Meanwhile, at the initial position which is the state before the medicinal agent and the medicinal fluid are mixed, a length ratio of the front chamber 2 and the rear chamber 3 may be in a range of 1.6:1 to 3:1.

More specifically, a length L1 of the front chamber 2 refers to a length from the rear surface 22 of the first stopper 20 to the front surface 31*a* of the first member 31 of the second stopper 30, and a length L2 of the rear chamber 3 refers to a length from the rear surface of the second stopper 30 to the front surface of the third stopper 40.

Here, the conical second member 35 may be further disposed on the front surface 31*a* of the second stopper 30, and even in this case, the length L1 of the front chamber may be the length from the rear surface of the first stopper 20 to the front surface 31*a* of the first member 31 of the second stopper 30. Also, the recessed portion 23 may be further disposed on the back surface (rear surface) of the first stopper 20, and even in this case, the length L1 of the front chamber may be the length from the rear surface of the first stopper 20 to the front surface 31*a* of the first member 31 of the second stopper 30.

When the length L2 from the rear surface of the second stopper 30 to the front surface of the third stopper 40 is 1, the length L1 from the rear surface 22 of the first stopper 20 to the front surface 31*a* of the first member of the second stopper 30 may be in a range of 1.6 to 3 (the length ratio of the front chamber and the rear chamber may be in the range of 1.6:1 to 3:1).

Preferably, when the length L2 from the rear surface of the second stopper 30 to the front surface of the third stopper 40 is 1, the length L1 from the rear surface 22 of the first stopper 20 to the front surface 31*a* of the first member of the second stopper 30 may be in a range of 1.8 to 2.8 (the length ratio of the front chamber and the rear chamber may be in the range of 1.8:1 to 2.8:1).

More preferably, when the length L2 from the rear surface of the second stopper 30 to the front surface of the third stopper 40 is 1, the length L1 from the rear surface 22 of the first stopper 20 to the front surface 31*a* of the first member of the second stopper 30 may be in a range of 2.0 to 2.6 (the length ratio of the front chamber and the rear chamber may be in the range of 2:1 to 2.6:1).

In other words, when the length L1 from the rear surface 22 of the first stopper 20 to the front surface 31*a* of the first member of the second stopper 30 is 1, the length L2 from the rear surface of the second stopper 30 to the front surface of the third stopper 40 may be in a range of 0.1 to 0.66 (the length ratio of the front chamber and the rear chamber may be in the range of 1:0.1 to 1:0.66).

As described above, the first and second support ribs 611 and 612, which are formed to be thicker than the reinforcing ribs 62, are disposed in the finger grip and the region in the cylinder that is adjacent to the finger grip so as to prevent shaking of the plunger rod 60. In particular, since the one surface (rear surface) of the second support rib 612 is disposed to coincide with the longitudinal end of the finger grip, it is possible to, while preventing the shaking of the plunger rod in the cylinder 10, more effectively prevent leakage of the medicinal fluid, which is accommodated in the rear chamber 3, toward the rear.

That is, since the one surface (rear surface) of the second support rib 612 is disposed to coincide with the longitudinal end (longitudinal end surface) of the extending portion 52, there is an effect that, when the user uses the syringe, the syringe may be used more stably without shaking of the plunger rod.

FIGS. 10 to 12 are views illustrating only major elements to describe one operational state of the two-chamber type combined container-syringe illustrated in FIG. 1.

Referring to FIGS. 10 to 12, in the initial state (see FIG. 10), the front chamber 2 and the rear chamber 3 are in a state in which a fluid is not movable therebetween (in a sealed state), the first ingredient (medicinal agent) is accommodated in the front chamber 2, and the second ingredient (medicinal fluid) is accommodated in the rear chamber 3.

In this state, when the plunger rod 60 is pressed forward, the second stopper 30 moves forward together with the medicinal fluid, and at a point where the rear surface 31*b* of the second stopper 30 passes through the inlet 110 of the bypass portion, the front chamber 2 and the rear chamber 3 communicate with each other so that a fluid is movable therebetween.

In particular, at the initial position, when the plunger rod 60 is moved toward the first end portion 11, the volume from the rear surface 22 of the first stopper to the first end portion 11 of the cylinder is maintained to be constant up to a bypass start position (a point right before the rear surface 31*b* of the second stopper 30 passes through the inlet 110 of the bypass portion, and a point where the rear surface 31*b* of the second stopper 30 and the inlet 110 of the bypass portion are collinear), and a length L3 from the rear surface 22 of the first stopper to the first end portion 11 of the cylinder is also maintained to be constant (see FIG. 11).

At the initial position described above, as the plunger rod 60 moves toward the first end portion 11 and passes through the position where the front chamber and the rear chamber begin to communicate with each other through the bypass portion (the point where the rear surface 31*b* of the second stopper 30 passes through the inlet 110 of the bypass portion), the medicinal fluid flows into the front chamber 2 along the flow path 130 and is mixed with the medicinal agent (see FIG. 12).

Here, the user may shake the syringe 1 to mix the medicinal agent and the medicinal fluid.

After the medicinal agent and the medicinal fluid are mixed as described above, when the plunge rod 60 is pressed forward, the mixture of the medicinal agent and the medicinal fluid moves forward, the first stopper 20 moves forward and enters the space 71 as a result, and the mixture of the medicinal agent and the medicinal fluid that is in the front chamber 2 is moved toward the needle 6 through the predetermined gap formed due to the first stopper 20 coming in contact with the gap forming portions 72 and 73.

According to the present invention, since the first to third stoppers 20, 30, and 40 are disposed in the cylinder 10 so that the length ratio of the front chamber and the rear chamber is as described above, the volumes of the front chamber 2 and the rear chamber 3 may be further improved.

Accordingly, since a contact area in which the medicinal fluid accommodated in the rear chamber 3 comes in contact with the second and third stoppers 30 and 40 is decreased, stability of storing the medicinal fluid may be further improved.

Also, since the volume of the front chamber 2 is further improved, when mixing the medicinal agent and the medicinal fluid after the medicinal fluid is moved to the front chamber 2, the mixing may be performed more promptly and effectively.

Here, the volume of the front chamber refers to the volume between the rear surface of the first stopper and the second stopper, and the volume of the rear chamber refers to the volume between the rear surface of the second stopper and the front surface of the third stopper.

Also, the conical recessed portion 23 of the first stopper 20 serves to effectively disperse the kinetic energy of the medicinal fluid flowing into the front chamber 2.

When the plunger rod 60 is pressed, the second stopper 30 moves forward together with the medicinal fluid, and when the rear surface 31*b* of the second stopper 30 passes through the inlet 110 of the bypass portion 100, the medicinal fluid flows into the front chamber 2 along the flow path 130 and collides with the inclined surface of the recessed portion 23 such that a vortex is generated.

Consequently, the vortex may accelerate mixing of the medicinal agent and the medicinal fluid.

The invention claimed is:

1. A two-chamber type combined container-syringe comprising:
   - a cylinder having a first end portion, a second end portion in an opposite direction of the first end portion, and a bypass portion disposed between the first end portion and the second end portion;
   - a finger grip mounted on the second end portion of the cylinder;
   - a first stopper, a second stopper, and a third stopper that are sequentially disposed from the first end portion toward the second end portion in a space of the cylinder; and
   - a plunger rod that is connected to the third stopper and has a plurality of support ribs provided to come in contact with an inner surface of the finger grip,
   - wherein a space between the first stopper and the second stopper forms a front chamber, and a space between the second stopper and the third stopper forms a rear chamber,
   - a first ingredient and a second ingredient are accommodated in the front chamber and the rear chamber, respectively,
   - a length ratio of the front chamber and the rear chamber is in a range of 1.6:1 to 3:1 when the plunger rod is at an initial position which is a state before the front chamber and the rear chamber communicate with each other through the bypass portion,
   - wherein the initial position refers to a state in which the first and second ingredients are accommodated in the front chamber and the rear chamber, respectively, before the plunger rod is moved forward,
   - wherein the finger grip includes a grip portion and an extending portion that extends from the grip portion toward the plunger rod, and
   - wherein the grip portion includes a first surface having a first insertion hole formed at an opening on one side and a second surface having a second insertion hole provided so that the plunger rod, which is in an opposite direction of the first surface, is inserted thereinto,
   - wherein the second end portion of the cylinder is inserted to the first insertion hole of the grip portion,
   - wherein the extending portion extends from the second surface of the grip portion toward the plunger rod,
   - wherein the extending portion is formed to extend from the second surface in the longitudinal direction along the circumferential direction of the second insertion hole,
   - wherein the extending portion has a constant diameter along the longitudinal direction,
   - wherein, at the initial position, at least one support rib of the plurality of support ribs is disposed in the extending portion and at least one support rib of the plurality of support ribs is disposed in a region of the cylinder that is adjacent to the finger grip, and
   - wherein at the initial position, one support rib is disposed so that one surface thereof coincides with a longitudinal end of the extending portion.

2. The two-chamber type combined container-syringe of claim 1,
   - wherein the second stopper has a plurality of contact ribs that come in contact with an inner circumferential surface of the cylinder, and a surface of the rearmost contact rib, which is adjacent to the finger grip, that comes in contact with the inner circumferential surface of the cylinder is formed as a flat surface.

3. The two-chamber type combined container-syringe of claim 2, wherein a surface of at least one contact rib that comes in contact with the inner circumferential surface of the cylinder is formed as a curved surface portion.

4. The two-chamber type combined container-syringe of claim 2, wherein:
   - the second stopper includes a first member that has a front surface, a rear surface, and a plurality of contact ribs and a second member that protrudes from the first member toward the first end portion; and
   - the plurality of contact ribs may be formed on a side surface that connects the front surface and the rear surface.

5. The two-chamber type combined container-syringe of claim 1, wherein:

the plunger rod further includes a plurality of reinforcing ribs disposed at rear ends of the support ribs; and a thickness of each support rib is formed to be thicker than a thickness of each reinforcing rib.

6. The two-chamber type combined container-syringe of claim 2, wherein:

the second stopper has a first contact rib, a second contact rib, a third contact rib, and a fourth contact rib; and a gap between the second and third contact ribs is larger than a gap between the first and second contact ribs or a gap between the third and fourth contact ribs.

* * * * *